United States Patent [19]
Huber et al.

[11] 3,794,295
[45] Feb. 26, 1974

[54] SHUTOFF VALVE

[75] Inventors: Richard Huber, Modling Bei Wien, Austria; Peter Wirz, Unterkulm/Aargau, Switzerland

[73] Assignee: Klinger AG, Zug, Switzerland

[22] Filed: Mar. 2, 1973

[21] Appl. No.: 337,748

[30] Foreign Application Priority Data
Mar. 8, 1972  Switzerland.................... 3401/72

[52] U.S. Cl................................. 251/189, 251/191
[51] Int. Cl............................................. F16k 11/14
[58] Field of Search........... 251/176, 186, 189, 191; 132/630.14

[56] References Cited
UNITED STATES PATENTS

| | | | |
|---|---|---|---|
| 1,781,224 | 11/1930 | Gilg | 251/191 |
| 3,211,418 | 10/1965 | Klinger-Hohr | 251/176 |
| 3,623,508 | 11/1971 | Huber | 251/191 |

FOREIGN PATENTS OR APPLICATIONS

| | | | |
|---|---|---|---|
| 821,565 | 10/1959 | Great Britain | 251/191 |

Primary Examiner—Harold W. Weakley
Attorney, Agent, or Firm—Werner W. Kleeman

[57] ABSTRACT

A shutoff valve incorporating a plunger piston which carries at least one axially compressible sealing ring for sealing the piston against the valve housing, and which in each actuated position is subjected to an axial elastic compression which increases in the closed position of the valve plunger piston during further movement of an actuation spindle carrying the piston in the valve closed direction. The sealing ring is clamped between a first piston part or portion and an annular spring which cooperates with a second piston part or portion. In the closed position of the plunger piston, this annular spring bears against a stop fixed to the valve housing, so that the annular spring is displaced relative to both piston parts which are fixedly connected with one another during further movement of the actuation spindle in the closed direction of the valve in the sense of exerting an additional axial compression upon the sealing ring.

13 Claims, 2 Drawing Figures

SHUTOFF VALVE

BACKGROUND OF THE INVENTION

The present invention broadly relates to the valve art and, more specifically, relates to a new and improved construction of shutoff or cutoff valve having a plunger piston which carries at least one axially compressible sealing ring for sealing against the housing and which in each actuation position is subjected to an axial elastic compression which increases in the closed position of the valve during further movement of an actuation spindle carrying the plunger piston when such spindle moves in the closed direction.

Valves of this type possess the advantage in contrast to other plunger piston valves with sealing rings that such, even during longer operating periods in which the valve remains open, do not become loosened (without being squeezed or forced out) owing to the continuous elastic compression, therefore, possess greater longevity. The additional compression in the closed state of the valve provides the required radial bearing contact at the valve seat.

SUMMARY OF THE INVENTION

It is a primary object of the present invention to provide a new and improved construction of valve of the previously mentioned type which, without sacrificing the advantages of the known constructions, is simpler in construction and therefore considerably more economical to fabricate.

Now, in order to implement this object and others which will become more readily apparent as the description proceeds, the invention contemplates a shutoff or cutoff valve of the aforementioned type which is manifested by the features that the sealing ring is clamped between a first piston part or portion and an annular spring cooperating with a second piston part or portion, the annular spring in the closed position of the plunger piston bearing against a stop which is fixed to the valve housing, so that the annular spring is displaced relative to both of the piston parts which are fixedly connected with one another during further movement of the actuation spindle in the closed direction in the sense of exerting an additional axial compression upon the sealing ring.

An annular spring constitutes a very space-saving resilient element having extremely great structural mechanical effect because the stresses are almost uniformly divided over the cross-section of each annular spring element. The thus attained construction is therefore very simple, low in weight and accordingly economical. Since the annular spring is moved by the housing stop in the sense of relaxing the spring, the spring elements moved relative to the piston during a subsequent opening operation remain in the last assumed position, whereby there is attained an equilibrium condition between the spring force of the annular spring and the reaction force occurring during compression of the sealing ring. In this manner, the sealing ring is always subjected to a certain elastic compression.

A particularly simple constructional manifestation of the invention can be realized if the annular spring consists of a ring member which at its outside surface is cylindrical, and also having an inner conical surface which cooperates with a conical surface at the second piston part or portion, the cone of conical surfaces increasing in diameter in the closing direction. The annular spring then directly forms the support for the sealing ring and its diameter practically coincides with the dimensions of the sealing ring. Both of the piston portions, if desired with axial non-displaceable mounting thereof at a spindle end, are advantageously connected with one another by a screw connection, wherein with the sealing ring inserted there is produced by means of said screw connection, the stressing of the annular spring.

During assembly there occurs the stressing of the annular spring and compression of the sealing ring by such spring, so that the assembly of the sealing ring with the inventive shutoff valve is not associated with any more expenditures than for a conventional sleeve valve. The cone angle at the second piston part advantageously amounts to 7° to 20°, preferably 9° to 16°. The exact accommodation of the cone angle depends upon the elastic properties of the sealing ring because the accommodation must occur between the spring force (which must be overcome during stressing of the spring connection), the restoring or recoil force (which continuously acts upon the sealing ring) and the required spring path. In order to impart to the sealing ring an additional safeguard against erosion or fatigue, the sealing ring can be subjected to an additional axial compression which decreases from the outer periphery towards the inside, and which can be realized when the sealing ring is assembled by carrying out a rotation or turning of the annular spring through a maximum of 5° during interconnection of both piston parts. The sealing ring is therefore fixedly clamped especially well at the outer circumference, wherein owing to the reduction of the compressive force towards the valve or plunger piston axis and due to the turning or rotation of the annular spring there is avoided every force component which would act in the sense of pressing the sealing ring out of its clamped position.

If the difference of the cone angle between the end surface of the sealing ring and the countersurface at the annular spring and between the conical surface at the second piston part and the countersurface at the annular spring are of the same magnitude and amount to between one half of a degree and 4°, there is attained a good support for the annular spring in the clamped condition because then after the clamping operation of the sealing ring at the piston the annular spring bears against the conical surface. Since in this case there occur displacements and rotations or twisting of the annular ring both during the mounting of the sealing ring as well as also during the operation of the valve, the edge of the annular spring which is present between the countersurface for the sealing ring and the countersurface for the piston cone is advantageously rounded, because this edge is continuously in contact with the piston. A very simple construction of piston can be obtained if the cone or conical surface at the second piston part transforms into a substantially cylindrical receiving or mounting surface for the sealing ring. The annular spring then can be mounted in the most simple manner, so that there is formed a receiving or mounting surface for the sealing ring which consists of a radial surface and cylindrical surface. If corrosion resistance is required for the annular spring construction, then this annular spring can be advantageously fabricated from austenitic steel which has imparted to it the required strength by cold working. In order to improve the sliding properties between the second piston part and the annular spring, it is recommended in a great many instances to also carry out surface treatment. At the piston, which oftentimes can consist of conventional carbon steel, it is recommended in such cases to carry out chromium plating, whereas the annular spring can be soft nitrided (Tenifer process).

BRIEF DESCRIPTION OF THE DRAWING

The invention will be better understood and objects other than those set forth above, will become apparent when consideration is given to the following detailed description thereof. Such description makes reference to the annexed drawing wherein.

DETAILED DESCRIPTION OF THE PREFERRED EMBODIMENTS

Figure 1:
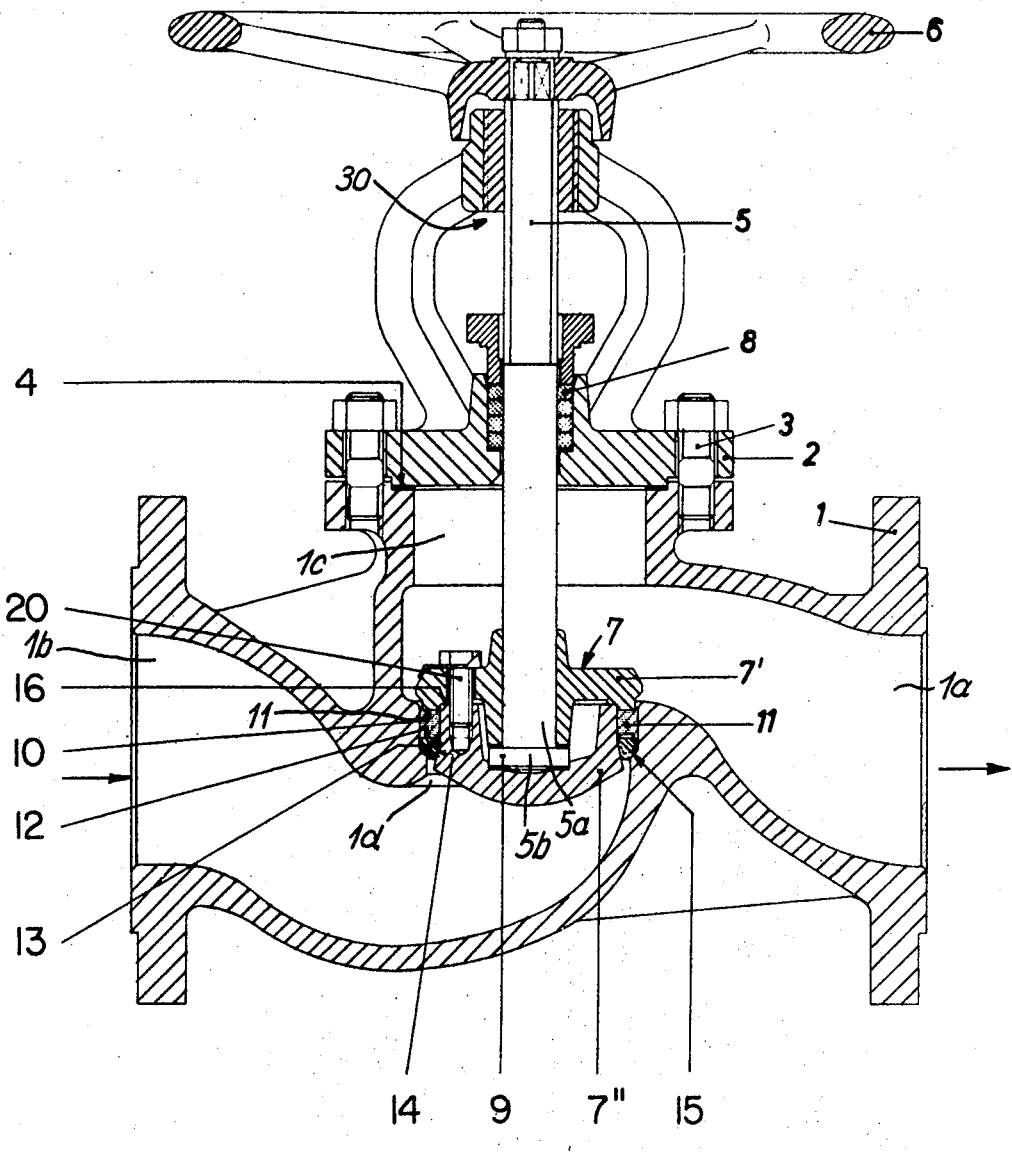
FIG. 1 is an elevational sectional view depicting a preferred constructional embodiment of shutoff valve designed according to the teachings of the present invention.

Describing now the drawings, the exemplary embodiment of shutoff valve as depicted therein will be recognized to comprise a housing 1 having an inlet opening, such as opening 1b, and an outlet opening, such as opening 1a, as well as an opening 1c for the displacement compartment of the plunger piston 7. This opening 1c is closed by an upper closure portion 2 with the aid of setscrews 3 or the like and an intermediately disposed sealing member or gasket 4. At this upper closure portion 2 a valve spindle 5 is appropriately mounted to be axially displaceable through the agency of a threaded connection, generally indicated by reference character 30, so that by means of the handwheel 6 the plunger piston 7 secured to the other end 5a of the spindle 5 can be axially displaced. Sealing of the spindle 5 is undertaken by means of a packing sleeve or bushing 8 for instance. The spindle 5 possesses at its one end 5a a collar 5b which insures for the axial non-displaceability of the piston 7 which consists of two piston parts or portions 7' and 7'' and which are fixed or clamped together by means of the screws 20 or the like.

The one upper piston part 7' is rotatably mounted upon the end 5a of the spindle 5 and possesses an end face 10 of substantially cylindrical shape for supporting a sealing ring 11, whereas a second end face 12 serving for clamping this sealing ring 11 is formed by a surface of an annular or ring-shaped spring 13 having an inner conical surface 13b and which bears upon a cone or conical surface 14 of the second lower piston part 7'' and which conical surface increases in diameter in the closed direction of the piston. The dimensions of the pistons parts 7' and 7'', the sealing ring 11, and the annular spring 13 are chosen such that during securing or clamping together of both piston parts 7' and 7'' by means of the screws 20 until impact of both piston parts against one another at location 16, the annular spring 13 is stressed or clamped to such an extent that there is realized the required axial compression of such sealing ring 11.

Figure 2:
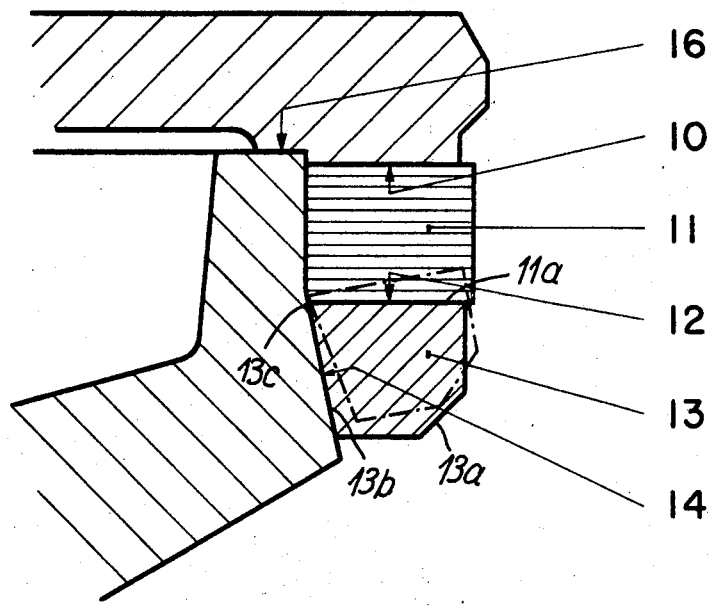
FIG. 2 is an enlarged detail showing of a portion of the valve structure depicted in FIG. 1.

The annular spring 13 originally possesses the position and shape shown in phantom lines in FIG. 2, which upon clamping together of the piston parts 7' and 7'' and rotation or turning of the cross-section and enlargement of the diameter of the spring transforms into the full-line position. The end surface 12 of the annular spring 13 which acts as a countersurface confronting the sealing ring 11 is therefore originally inclined towards the vertical axis of the spindle 5 and possesses a conical configuration; during clamping together of the piston parts the annular spring 13 is downwardly displaced, whereby it increases in diameter and the end surface 12 confronting the sealing ring 11, which originally was conical, conforms into a planar or flat surface, as shown in full lines in FIG. 2. In so doing, the parts of the annular spring at the region of such end surface, and which are located further towards the outside, move through a greater axial path than the further inwardly disposed parts of the annular spring, so that the further outwardly located parts exert a greater reaction force in the direction of the original position upon the sealing ring 11. Due to the additional twisting or rotation of the annular spring, there is realized an additional compressive force at the regions of the outer substantially cylindrical jacket or surface of the sealing ring 11 which therefore is continuously subjected to an axial force which works against an unlimited enlargement of the outer periphery of the sealing ring.

As soon as through rotation of the handwheel 6 the piston 7 is brought by the spindle 5 into its lower terminal position then the annular spring 13 bears by means of its bevelled portion 13a at a shoulder 15 defining a fixed stop of the housing 1. As soon as then the spindle 5, through the agency of the handwheel 6, begins to move the piston 7 in the sense of a further closing movement, then the sealing ring 11 is further axially compressed together, whereby the annular spring 13 moves relative to the lower piston part 7'' in the sense of relaxing the spring. During subsequent opening of the valve, the annular spring 13 then remains practically in the displaced position, but it still acts upon the sealing ring 11 with the remaining restoring force in the sense of carrying out a resilient axial compression. The sealing ring 11 is therefore continuously subjected to such compressive force or compression which in the closed position of the piston 7 can be increased due to further application of a spindle force acting in the closing direction, so that the sealing ring 11 bears in a faultless sealing manner against the housing bore 1d. If necessary, this housing bore can be provided with a lining formed of corrosion resistant steel to safeguard against corrosion effects.

Further, as already indicated above, the difference of the cone angle between the end surface 11a of the sealing ring and the countersurface 12 of the annular spring 13 and between the conical surface 14 at the second piston part 7'' and the countersurface 13b at the annular spring 13 are of the same magnitude and in a range between 0.5° and 4°. Furthermore, a rounded edge, as generally indicated by reference character 13c, is advantageously provided between the countersurface 12 at the annular spring 13 for the sealing ring 11 and the countersurface 13b for the conical surface 14 of the second piston part 7''.

While there is shown and described present preferred embodiments of the invention, it is to be distinctly understood that the invention is not limited thereto, but may be otherwise variously embodied and practiced within the scope of the following claims.

What is claimed is:

1. A shutoff valve comprising a valve housing, a plunger piston displaceably mounted within said housing, at least one axially compressible sealing ring carried by such plunger piston for exerting a sealing action against the housing, said sealing ring being subjected to an axial elastic compressive force throughout each actuation position thereof, an actuation spindle for carrying said plunger piston to move the latter between an open position and a closed position, the axial elastic compressive force increasing in the closed position of the plunger piston during further movement of the actuation spindle carrying said plunger piston, said plunger piston having a first piston part and a second piston part, means for fixedly interconnecting said piston parts with one another, an annular spring cooperating with said second piston part, said sealing ring being clamped between the first piston part and said annular spring cooperating with said second piston part, a fixed stop stationarily mounted at the valve housing, said annular spring bearing against the fixed stop in the closed position of the plunger piston so that the annular spring is displaced relative to both of the fixedly connected piston parts during further movement of the actuation spindle in the closed direction in the sense of exerting an additional axial compression upon the sealing ring.

2. The shutoff valve as defined in claim 1, wherein the annular spring comprises a ring member having an external substantially cylindrical surface, said ring member having an inner substantially conical surface, said second piston part having a conical surface, the inner conical surface of the ring member cooperating with the conical surface of the second piston part, said conical surface of the second piston part increasing in diameter in the closed direction.

3. The shutoff valve as defined in claim 2, wherein said means for connecting both piston parts with one another comprises means providing a screw connection, and wherein with the sealing ring inserted between said piston parts the screw connection stresses the annular spring.

4. The shutoff valve as defined in claim 3, further including means for providing an axial non-displaceable mounting of said piston at one end of the spindle.

5. The shutoff valve as defined in claim 3, wherein the cone angle of the conical surface at the second piston part is in a range of 7° to 20°.

6. The shutoff valve as defined in claim 5, wherein the cone angle is in a range of 9° to 16°.

7. The shutoff valve as defined in claim 5, wherein said sealing ring is subjected to an additional axial compressive force which decreases from the outer circumference thereof towards the inside, said additional axial compressive force being produced with the inserted sealing ring through turning of the annular spring through a maximum of 5° during interconnection of both piston parts in that an originally conical end surface of the annular spring confronting the sealing ring is deformed into a substantially flat surface.

8. The shutoff valve as defined in claim 7, wherein the originally conical end surface of the annular spring defines a countersurface for a confronting end surface of the sealing ring, and wherein said annular spring possesses a further countersurface confronting the conical surface at the second piston part, and wherein the difference of the cone angle between the end surface of the sealing ring and its confronting countersurface of the annular spring and between the conical surface of the second piston part and its confronting countersurface at the annular spring are of the same magnitude and in a range between 0.5° and 4°.

9. The shutoff valve as defined in claim 8, wherein a rounded edge is provided for the annular spring between its countersurface for the sealing ring and its countersurface for the conical surface of the second piston part.

10. The shutoff valve as defined in claim 9, wherein the conical surface at the second piston part transforms into a substantially cylindrical receiving surface for the sealing ring.

11. The shutoff valve as defined in claim 1, wherein the annular spring consists of cold worked austenitic steel.

12. The shutoff valve as defined in claim 2, wherein the conical surface at the second piston part is chromium plated and the annular spring is nitrided.

13. The shutoff valve as defined in claim 1, wherein the annular spring possesses at its outer circumference a bevelled portion for cooperation with the fixed stop.

* * * * *